(12) United States Patent
Biswas et al.

(10) Patent No.: US 8,041,883 B2
(45) Date of Patent: *Oct. 18, 2011

(54) RESTORING STORAGE DEVICES BASED ON FLASH MEMORIES AND RELATED CIRCUIT, SYSTEM, AND METHOD

(75) Inventors: Sudeep Biswas, Delhi (IN); Angelo Di Sena, Castello di Cistema (IT); Domenico Manna, Acerra (IT)

(73) Assignees: STMicroelectronics S.r.l., Agrate Brianza (MB) (IT); STMicroelectronics Pvt. Ltd., Greater Noida (IN)

( * ) Notice: Subject to any disclaimer, the term of this patent is extended or adjusted under 35 U.S.C. 154(b) by 331 days.

This patent is subject to a terminal disclaimer.

(21) Appl. No.: 11/801,687

(22) Filed: May 9, 2007

(65) Prior Publication Data

US 2008/0282023 A1   Nov. 13, 2008

(51) Int. Cl.
*G06F 12/10* (2006.01)
(52) U.S. Cl. .. 711/103; 711/156; 711/210; 711/E12.058
(58) Field of Classification Search .................. 711/103, 711/156, 210
See application file for complete search history.

(56) References Cited

U.S. PATENT DOCUMENTS

| | | | |
|---|---|---|---|
| 4,800,520 A | | 1/1989 | Iijima |
| 5,107,481 A | | 4/1992 | Miki et al. |
| 5,471,604 A | * | 11/1995 | Hasbun et al. .................. 711/4 |
| 5,479,633 A | * | 12/1995 | Wells et al. .................. 711/103 |
| 5,566,314 A | * | 10/1996 | DeMarco et al. ............. 711/103 |
| 5,832,493 A | * | 11/1998 | Marshall et al. ............. 707/101 |
| 5,867,641 A | | 2/1999 | Jenett |
| 6,104,638 A | * | 8/2000 | Larner et al. ............. 365/185.33 |
| 6,170,066 B1 | * | 1/2001 | See .................................. 714/22 |
| 6,449,625 B1 | | 9/2002 | Wang |
| 6,513,095 B1 | * | 1/2003 | Tomori ......................... 711/103 |
| 6,834,331 B1 | * | 12/2004 | Liu ............................... 711/156 |
| 6,895,490 B1 | * | 5/2005 | Moore et al. .................. 711/203 |

(Continued)

OTHER PUBLICATIONS

Gay, David. "Design of Matchbox, the simple filing system for motes." Aug. 21, 2003. http://www.tinyos.net/tinyos-1.x/doc/matchbox-design.pdf.*

(Continued)

*Primary Examiner* — Reginald G. Bragdon
*Assistant Examiner* — Nathan Sadler
(74) *Attorney, Agent, or Firm* — Lisa K. Jorgenson; Kevin D. Jablonski; Graybeal Jackson LLP

(57) ABSTRACT

A solution for restoring operation of a storage device based on a flash memory is proposed. The storage device emulates a logical memory space (including a plurality of logical blocks each one having a plurality of logical sectors), which is mapped on a physical memory space of the flash memory (including a plurality of physical blocks each one having a plurality of physical sectors for storing different versions of the logical sectors). A corresponding method starts by detecting a plurality of conflicting physical blocks for a corrupted logical block (resulting from a breakdown of the storage device). The method continues by determining a plurality of validity indexes (indicative of the number of last versions of the logical sectors of the corrupted logical block that are stored in the conflicting physical blocks). One ore more of the conflicting physical blocks are selected according to the validity indexes. The selected conflicting physical blocks are then associated with the corrupted logical block. At the end, each one of the non-selected conflicting physical blocks is discarded.

10 Claims, 11 Drawing Sheets

U.S. PATENT DOCUMENTS

| | | | |
|---|---|---|---|
| 6,973,531 B1 | 12/2005 | Chang et al. | |
| 7,035,993 B2 | 4/2006 | Tai et al. | |
| 7,457,909 B2 | 11/2008 | Di Sena et al. | |
| 2002/0199054 A1* | 12/2002 | Akahane et al. | 711/103 |
| 2003/0158862 A1* | 8/2003 | Eshel et al. | 707/200 |
| 2003/0165076 A1* | 9/2003 | Gorobets et al. | 365/200 |
| 2004/0039872 A1* | 2/2004 | Takamizawa et al. | 711/103 |
| 2004/0078666 A1* | 4/2004 | Aasheim et al. | 714/24 |
| 2004/0255090 A1* | 12/2004 | Guterman et al. | 711/156 |
| 2004/0268064 A1* | 12/2004 | Rudelic | 711/156 |
| 2005/0289558 A1 | 12/2005 | Illowsky et al. | |
| 2006/0031710 A1 | 2/2006 | Jo | |
| 2006/0155917 A1 | 7/2006 | Di Sena et al. | |
| 2006/0161723 A1* | 7/2006 | Sena et al. | 711/103 |
| 2006/0184719 A1 | 8/2006 | Sinclair | |
| 2006/0271725 A1* | 11/2006 | Wong | 711/103 |
| 2007/0016721 A1 | 1/2007 | Gay | |
| 2007/0033329 A1 | 2/2007 | Sinclair et al. | |
| 2007/0033374 A1 | 2/2007 | Sinclair et al. | |
| 2007/0083697 A1* | 4/2007 | Birrell et al. | 711/103 |
| 2007/0113001 A1* | 5/2007 | Yamada | 711/103 |
| 2007/0143531 A1* | 6/2007 | Atri | 711/103 |
| 2007/0174549 A1 | 7/2007 | Gyl et al. | |
| 2007/0300037 A1* | 12/2007 | Rogers et al. | 711/202 |
| 2008/0235306 A1* | 9/2008 | Kim et al. | 707/206 |
| 2008/0282025 A1* | 11/2008 | Biswas et al. | 711/103 |

OTHER PUBLICATIONS

Kim, Han-joon and Sang-goo Lee. "A New Flash Memory Management for Flash Storage System." 1999. IEEE. COMPSAC '99.*

Mathur, Gaurav; Peter Desnoyers; Deepak Ganesan; and Prashant Shenoy. "Capsule: An Energy-Optimized Object Storage System for Memory-Constrained Sensor Devices." Nov. 2006. ACM. SenSys '06.*

Hill, Jason Lester. System Architecture for Wireless Sensor Networks. 2003. University of California, Berkeley.*

Gal, Eran and Sivan Toledo. "Algorithms and Data Structures for Flash Memories." Jun. 2005. ACM. ACM Computing Surveys. vol. 37. Iss. 2. pp. 138-163.*

Manning, Charles and Wookey. "YAFFS (Yet Another Flash File System)." Feb. 2002.*

Brown, Stephen and Zvonko Vranesic. Fundamentals of Digital Logic with VHDL Design. 2000. McGraw-Hill Higher Education. pp. 2-6.*

Jeong-Uk Kang, Heeseung Jo, Jin-Soo Kim, and Joonwon Lee. "A Superblock-based Flash Translation Layer for NAND Flash Memory." Oct. 2006. ACM. EMSOFT '06.*

U.S. Appl. No. 12/075,991, filed May 9, 2007, titled, "Wear Leveling in Storage Devices Based on Flash Memories and Related Circuit, System, and Method,", Inventor: Biswas et al.

U.S. Appl. No. 11/501,742, filed May 9, 2007, titled, "Management of Erase Operations in Storage Devices Based on Flash Memories,", Inventor: Biswas et al.

U.S. Appl. No. 11/801,745, filed May 9, 2007, titled, "Garbage Collection in Storage Devices Based on Flash Memories,", Inventor: Biswas et al.

* cited by examiner

FIG.3D

RESTORING STORAGE DEVICES BASED ON FLASH MEMORIES AND RELATED CIRCUIT, SYSTEM, AND METHOD

CROSS REFERENCE TO RELATED APPLICATIONS

This application is related to U.S. patent application Ser. Nos. 12/075,991 entitled WEAR LEVELING IN STORAGE DEVICES BASED ON FLASH MEMORIES AND RELATED CIRCUIT, SYSTEM, AND METHOD Ser. No. 11/801,742 entitled MANAGEMENT OF ERASE OPERATIONS IN STORAGE DEVICES BASED ON FLASH MEMORIES, and Ser. No. 11/801,745 entitled GARBAGE COLLECTION IN STORAGE DEVICES BASED ON FLASH MEMORIES, which have a common filing date and owner and which are incorporated by reference.

TECHNICAL FIELD

An embodiment of the present disclosure relates to the storage device field. More specifically, and embodiment of the present disclosure relates to storage devices based on flash memories.

BACKGROUND

Storage devices based on flash memories have become very attractive in the last years; for example, they are commonly used as mass memories (also known as solid-state mass memories) in several data processing systems. These storage devices are compact, robust and with low power consumption; therefore, they may be advantageous, especially in portable systems (such as mobile telephones), which are typically supplied by batteries.

Typically, flash memories used to implement the above-mentioned storage devices can be erased only in blocks having a relatively large size (for example, 16-32 Kbytes). Therefore, once data has been written into the flash memory, this data cannot be updated unless the corresponding whole block is erased. In order to emulate operation of a random access device (such as a standard hard-disk), a translation layer is provided on top of the flash memory. The translation layer manages any update of the data stored in the flash memory by writing a new version thereof in a different area of the flash memory, and at the same time updating corresponding mapping information.

A problem of the storage devices based on flash memories is that they may remain in an inconsistent condition when a power loss occurs during their operation. The risk is particularly high when the storage devices are used in portable systems (since they typically work in harsh environments).

For example, this may happen during a garbage collection procedure. The garbage collection procedure is used to recover the space taken by the old versions of the data stored in a generic block of the flash memory (being not valid any longer), when this block is full. For this purpose, the last version of the data stored in the (old) block is copied into a new block; at the end of the operation, the old block is erased and the mapping information is accordingly updated. Typically, as described in US-A-2006/0161723 (the entire disclosure of which is herein incorporated by reference), additional blocks of the flash memory are used for storing further versions of the data when the corresponding block is full, so as to implement a tree structure; in this way, it is possible to delay the execution of the garbage collection procedure. Nevertheless, when the tree structure reaches a predefined maximum number of levels, the space taken by the old versions of the data stored in the blocks of the tree structure is again be recovered; as above, the last version of the data stored in the old blocks is copied into a new block, and all the old blocks are erased (thus updating the mapping information).

In any case, a power loss during the garbage collection procedure may leave conflicting blocks in the flash memory for the same data. Moreover, the problem is magnified by the above-mentioned tree structure, since the data is collected from multiple blocks that are all erased at the end so that the garbage collection procedure takes a longer time.

Similar problems may be caused when the power loss occurs during a procedure for moving data stored in the flash memory, during a procedure for writing data into the flash memory, or during a procedure for erasing its blocks. In this case as well, the flash memory may remain in an inconsistent condition.

An approach that has been used to solve the above-mentioned problem is of providing a backup structure, which maintains the required power supply during each procedure involving any update of the stored data (even in case of power loss). However, this solution requires additional dedicated hardware, so that it may be burdensome on the structure of the storage device.

With reference in particular to the power loss during the garbage collection procedure, US-A-2006/0161723 also proposes associating a root counter with each block implementing a root node of the tree structure, which root counter is incremented whenever the data is copied from the old blocks to the new block. In this way, if two conflicting root blocks are found after the power loss, it is possible to discard the old one with the lower root counter. However, it has been noted that this solution is not completely satisfactory. Indeed, the use of the root counter does not allow restoring the storage device in any situation (for example, when the power loss occurred when the copying of the data was still in progress).

Another approach that has been used for the power loss during the writing procedure is of reading back the data after its writing; when the written data matches the desired value, it is validated by writing a specific flag into the flash memory. In any case, this solution requires an additional read procedure and an additional writing procedure; therefore, it may have a deleterious effect on the performance of the storage device.

SUMMARY

In its general terms, an embodiment of the present disclosure improves the restoring of the storage devices based on flash memories.

More specifically, an embodiment proposes a method for restoring operation of a storage device based on a flash memory. The storage device emulates a logical memory space (including a plurality of logical blocks each one having a plurality of logical sectors), which is mapped on a physical memory space of the flash memory (including a plurality of physical blocks each one having a plurality of physical sectors for storing different versions of the logical sectors). The method starts by detecting a plurality of conflicting physical blocks for a corrupted logical block (resulting from a breakdown of the storage device). The method continues by determining a plurality of validity indexes (indicative of the number of last versions of the logical sectors of the corrupted logical block that are stored in the conflicting physical blocks). One ore more of the conflicting physical blocks are selected according to the validity indexes. The selected conflicting physical blocks are then associated with the corrupted logical block. At the end, each one of the non-selected conflicting physical blocks is discarded.

An embodiment is used to restore the storage device when the breakdown occurred during a garbage collection procedure.

For this purpose, a root counter is associated with each physical block.

The same embodiment may also be used to restore the storage device when the breakdown occurred during a moving procedure.

The two different situations may be discriminated by means of the root counters of the conflicting physical blocks.

As a further improvement, when the breakdown occurred during the moving procedure, it may be possible to select the conflicting physical block to be discarded (when the validity indexes are equal) according to the total number of the different versions of the logical sectors.

In addition or in alternative, a completion flag may be stored concurrently with the last version of each logical sector (so as to indicate its corruption when not asserted).

When the last version of a logical sector to be read is corrupted, it may then be possible to search for a (correct) previous version thereof.

The completion flag may include a plurality of bits.

The completion flag of the first physical sector of each physical block may also be used to restore the storage device when the breakdown occurred during an erasing procedure.

In an embodiment, the flash memory is of the NAND type.

Another embodiment is a software program for performing the method.

A further embodiment is a control system for restoring operation of a storage device.

A still further embodiment is a corresponding storage device.

Moreover, another embodiment is a data processing system including one or more storage devices.

BRIEF DESCRIPTION OF THE DRAWINGS

One or more embodiments of the present disclosure, as well as features and the advantages thereof, are best understood with reference to the following detailed description, given purely by way of a non-restrictive indication, to be read in conjunction with the accompanying drawings.

FIGS. 3A-3D show exemplary applications of the solution according to an embodiment.

DETAILED DESCRIPTION

Figure 1:
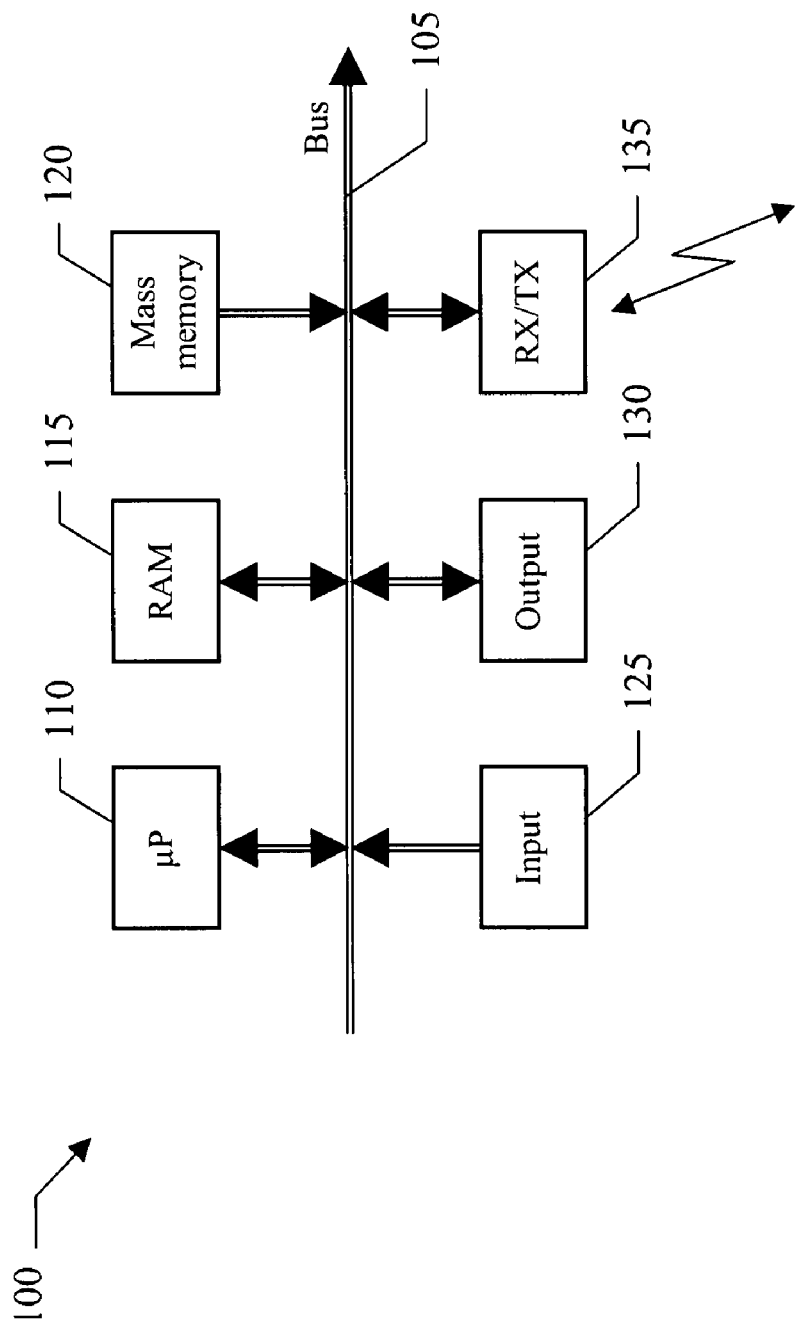
FIG. 1 is a schematic block diagram of a mobile telephone wherein the solution according to an embodiment can be practiced.

With reference now to FIG. 1, a mobile telephone 100 is illustrated. The telephone 100 is formed by several units that are coupled in parallel to a communication bus 105. In detail, a microprocessor (μP) 110 controls operation of the telephone 100; a RAM 115 is directly used as a working memory by the microprocessor 110. Several peripheral units are further coupled to the bus 105 (through respective drives). Particularly, a storage device 120 implements a solid-state mass memory; the storage device 120 is used to store data that should be preserved even when a power supply of the telephone 100 is off (for example, firmware for the microprocessor 110, application programs, and personal information of a user of the telephone 100 such as an address book). Moreover, the telephone 100 includes input units 125 (for example, a keypad, a microphone, and a camera), and output units 130 (for example, a display and a loudspeaker). A transceiver (RX/TX) 135 implements any communications with a telephone exchange (not shown in the figure) to send and receive information.

Figure 2A:
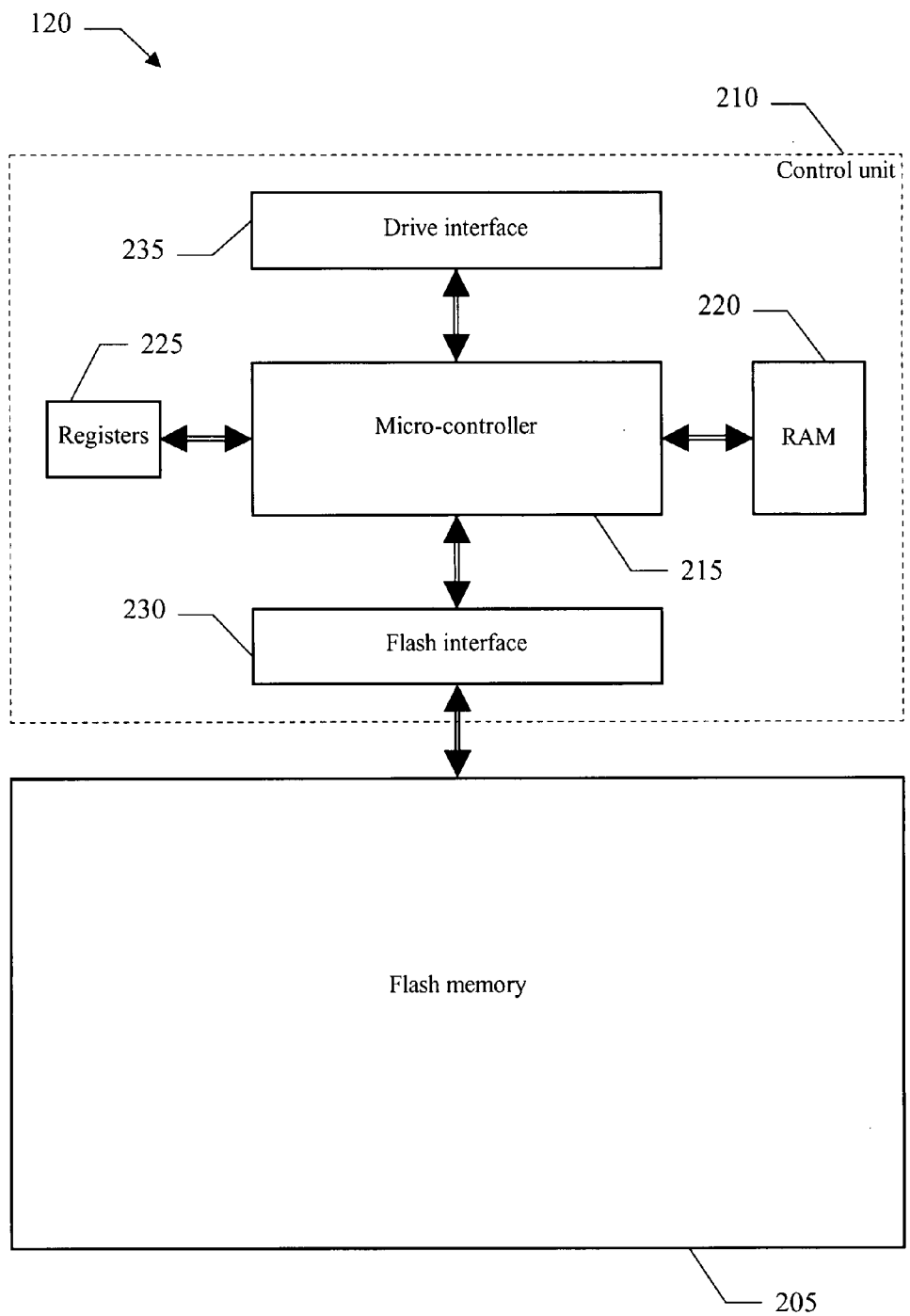
FIG. 2A is a high-level representation of an embodiment of a storage device included in the telephone.

Passing now to FIG. 2A, the storage device 120 is based on a flash memory 205. The flash memory 205 includes a matrix of memory cells with NAND architecture (not shown in the figure). The flash memory 205 programs and reads the memory cells at the level of physical pages (for example, each one consisting of 528 bytes). On the other hand, the memory cells are erased at the level of far larger physical blocks (for example, each one including 32 physical pages). Therefore, once a physical page has been programmed (so as to write the desired data into it), this physical page cannot be updated any longer—unless the whole respective physical block is erased (or the update involves only the further programming of its memory cells).

A control unit 210 manages the flash memory 205 so as to emulate a random access to the storage device 120. The control unit 210 is based on a micro-controller 215. The micro-controller 215 accesses a RAM 220 (being used as a working memory) and a series of registers 225. An interface 230 couples the micro-controller 215 with the flash memory 205; another interface 235 instead couples the same micro-controller 215 with the driver (not shown in the figure) of the telephone for the storage device 120.

Operation of the micro-controlled 215 is managed by firmware, which is stored in the flash memory 205 and then loaded (at least partially) into the RAM 220 when the micro-controller 215 is running; the firmware is initially installed onto the flash memory 205 during a manufacturing process of the storage device.

Figure 2B:
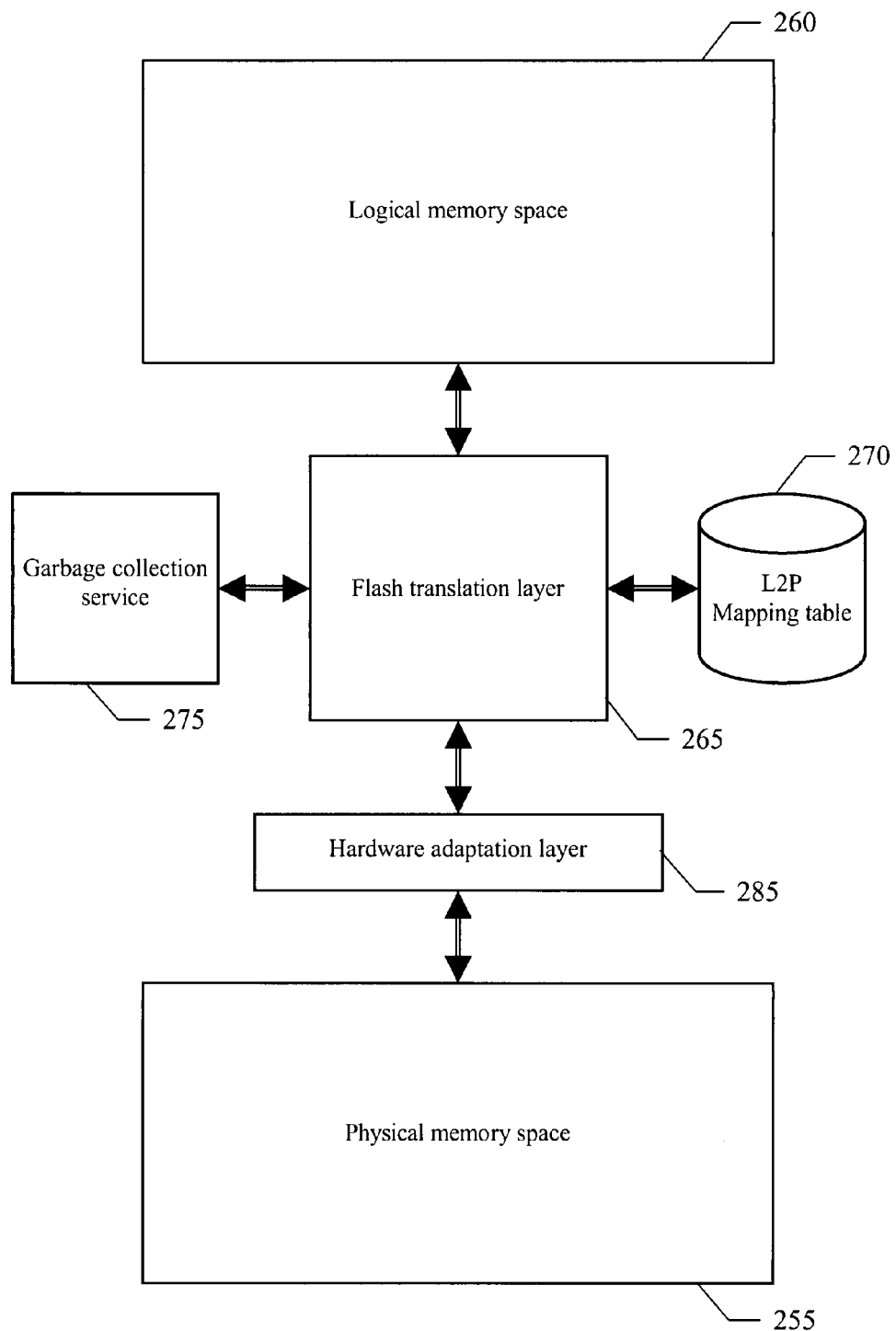
FIG. 2B is an embodiment of a functional scheme of the storage device.

A functional scheme of the same storage device is illustrated in FIG. 2B. The flash memory provides a physical memory space 255. The physical memory space 255 includes its physical blocks, which can be erased individually; each physical block is identified by a corresponding physical block number (for example, of 12 bits for accessing up to 4096 physical blocks). In turn, each physical block includes its physical pages, which can be programmed (only once for each memory cell) and read individually; each physical page is identified by a corresponding physical offset within the physical block (of 4 bits in the example at issue, wherein each physical block includes 32 physical pages).

The storage device 120 emulates a logical memory space 260. The logical memory space 260 includes logical sectors (for example, each one of 512 bytes), which can be written (repeatedly to any value) and read individually. The logical sectors are grouped into logical blocks (for example, each one including 32 logical sectors). Each logical block is identified by a corresponding logical block number (for example, again of 12 bits for accessing up to 4096 logical blocks); each logical sector is identified by a corresponding logical offset within the logical block (of 4 bits in the example at issue). The different versions of the logical sectors are written into corresponding physical sectors (each physical sector typically including a single physical page). The physical sector includes a main area for storing the value of the logical sector and a spare area for storing service information (i.e., 512 bytes and 16 bytes, respectively, in the example at issue).

A Flash Translation Layer (FTL) 265 maps the logical memory space 260 onto the physical memory space 255. Particularly, each logical block is associated with one or more physical blocks (organized into a tree structure); in a specific embodiment, the logical block is associated with a physical block that defines a root node, and possibly with another physical block that defines a leaf node (depending on the root node). The logical sectors of the logical block are written in succession into consecutive physical sectors of the associated physical block(s); the writing of the logical sectors starts from the root physical block, and then continues to the leaf physical block once the root physical block is full. Since the physical sectors can be programmed only once, any time a logical sector must be updated its new version is written into another physical sector. When a logical sector is written into a physical sector, its value is stored in the main area of the physical sector; the spare area instead stores an indication of the corresponding logical sector (for example, its logical offset). The spare area of the first physical sector of each physical block is also used to store an indication of the corresponding logical block (for example, its logical block number), and an indication of the position of the physical block in the tree structure (i.e., root node or leaf node); moreover, this spare area also includes a root counter—for example, of 8 bits so as to range from 0 to 255 (which purpose will be evident in the following).

The translation layer 265 also manages a Logical-to-Physical (L2P) mapping table 270. The mapping table 270 associates each logical block with its root physical block and leaf physical block (if any); in turn, the mapping table 270 associates each written logical sector with the physical sector (in the root physical block or in the leaf physical block) wherein its last version is stored. The mapping table 270 is created—at least partially—during an initialization of the storage device at its power-on (by reading the relevant information stored in the spare areas of the different physical sectors); the mapping table 270 is then maintained up-to-date according to the operations performed on the storage device.

The translation layer 265 interfaces with a service 275 that implements a garbage collection procedure. When the garbage collection service 275 is invoked for a specific logical block (for example, because both the root physical block and the leaf physical block associated with the logical block are full, so that no further writing can be performed on its logical sectors), the root and leaf physical blocks are compacted into a new root physical block.

The translation layer 265 controls the physical memory space 255 through a hardware adaptation layer 285. The adaptation layer 285 exports a command interface for reading/programming the physical pages and for erasing the physical blocks of the flash memory. The adaptation layer 285 implements different functions that are required to access the flash memory (such as a low level driver of the flash memory, an ECC manager, a defective blocks manager, and the like).

An example of this storage device is described in greater detail in the above-mentioned document US-A-2006/0161723.

In practical use, the storage device may by subject to sudden breakdowns (for example, because of a power loss). When the breakdown occurs while the storage device is performing a procedure involving any update of the data stored in the flash memory, the storage device typically remains in an inconsistent condition; for example, this happens during a garbage collection procedure, during a moving procedure, during a writing procedure, during an erasing procedure, and the like. Therefore, it may be necessary to restore the correct operation of the storage device at its next power-on (by detecting the inconsistent condition and correcting it).

In a solution according to an embodiment of the present disclosure, as described in detail in the following, the restoring of the storage device is based on the number of valid logical sectors that are included in the different physical blocks, which are associated (in conflict to each other) with the same logical block.

The desired result is achieved without requiring any additional dedicated hardware (with a beneficial effect on the structure of the storage device).

Nevertheless, the proposed embodiment allows restoring the storage device in most of (if not all) the practical situations.

Figure 3A:
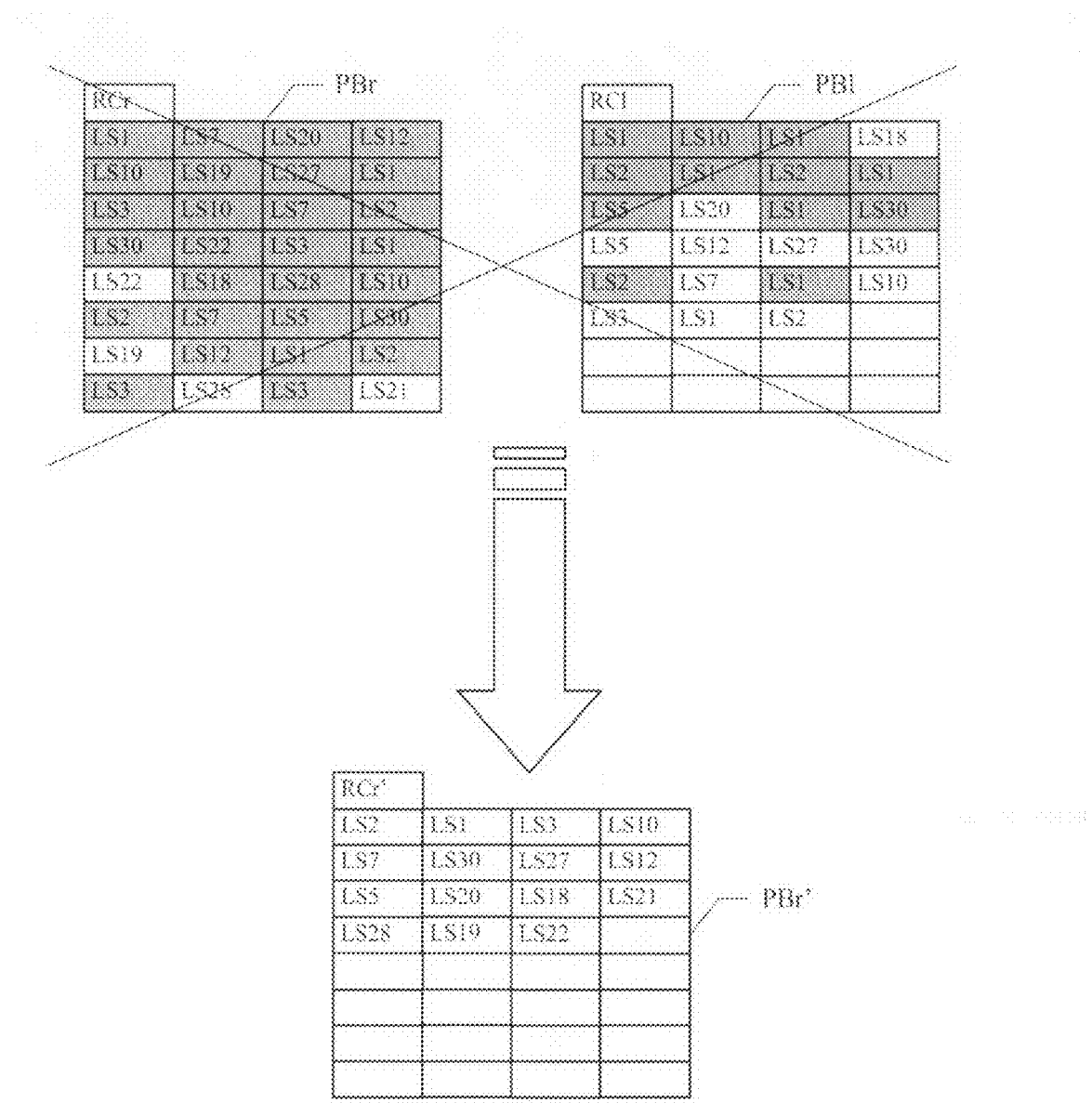

Particularly, the proposed embodiment may be applied to restore the storage device after a breakdown during a garbage collection procedure. For example, as shown in FIG. 3A, let us consider a generic logical block that is stored in a root physical block (denoted with PBr) and a leaf physical block (denoted with PBl); the root counter of the root physical block PBr (denoted with RCr) has a corresponding value (from 0 to 255), while the root counter of the leaf physical block PBl (denoted with CRl) has always a null value (for example, 255). The different versions of the corresponding logical sectors (denoted with LSi, i=0 . . . 31) have been written in succession into consecutive physical sectors of the root physical block PBr and then of the leaf physical block PBl (after its completion). The last version of each logical sector LSi is shown in the corresponding physical sector PBr,PBl with a white background; the proceeding versions thereof (not valid any longer) are instead shown with a gray background. For example, the logical sector LS1 has been written at the beginning into the $1^{st}$ physical sector of the root physical block PBr (starting from the upper left corner and then moving from left to right along each row, down to the lower right corner); next versions of the same logical sector LS1 have been written into the $16^{th}$ and the $27^{th}$ physical sectors of the root physical block PBr, and then into the $1^{st}$, the $3^{rd}$, the $6^{th}$, the $11^{th}$, and the $19^{th}$ physical sectors of the leaf physical block PBl. The last version of the logical sector LS1 has been written into the $22^{nd}$ physical sector of the leaf physical block PBl.

When the logical block is compacted, the last versions of its logical sectors LSi are copied from the (old) root physical block PBr and leaf physical block PBl into a new root physical block (differentiated with a prime notation, i.e., PBr'). For this purpose, the old physical blocks PBr,PBl are scanned backward (from the end of the old leaf physical block PBl to the beginning of the old root physical block PBr). Each encountered logical sector LSi is copied into the first available physical sector of the new root physical block PBr' when it is not present yet (being the last version thereof), while it is discarded otherwise (being a previous version thereof). At the end, the most recent versions of all the logical sectors LSi stored in the old physical blocks PBr,PBl will be written in the new root physical block PBr' (at most filling it). In this phase, the spare area of each programmed physical block is set accordingly. Particularly, the spare area of the first physical sector of the new root physical block PBr' will store the indication that it is the root node for the corresponding logical block; moreover, the corresponding root counter (denoted with RCr') is set to RCr+1—according to a wrap around sequence, so as to return to 0 after 255. At the same time, the mapping table is updated accordingly (so as to associate the logical block with the new root physical block PBr', and each written logical sector LSi thereof with the corresponding physical sector of the new root physical block PBr'). At the end, the old physical blocks PBr,PBl are erased (as indicated by a cross in the figure).

A breakdown of the storage device may occur during different phases of the above-described garbage collection procedure (before its completion). In any case, at the next power-on of the storage device, two conflicting root physical blocks (PBr and PBr') will be associated with the same (corrupted) logical block—with or without the old leaf physical block PBl; the new root physical block PBr' and the old root physical block PBr are discriminated between the two conflicting root physical blocks according to the values of their root counters—since the (new) root counter RCr' is higher—in the wrap-around sequence—than the (old) root counter RCr. One or more of the conflicting physical blocks PBr,PBr',PBl are then selected as the correct ones, while the other (garbled) conflicting physical blocks will be discarded (so as to be erased). The logic for the selection of the correct physical block(s) depends on when the breakdown occurred during the garbage collection procedure.

Figure 3B:
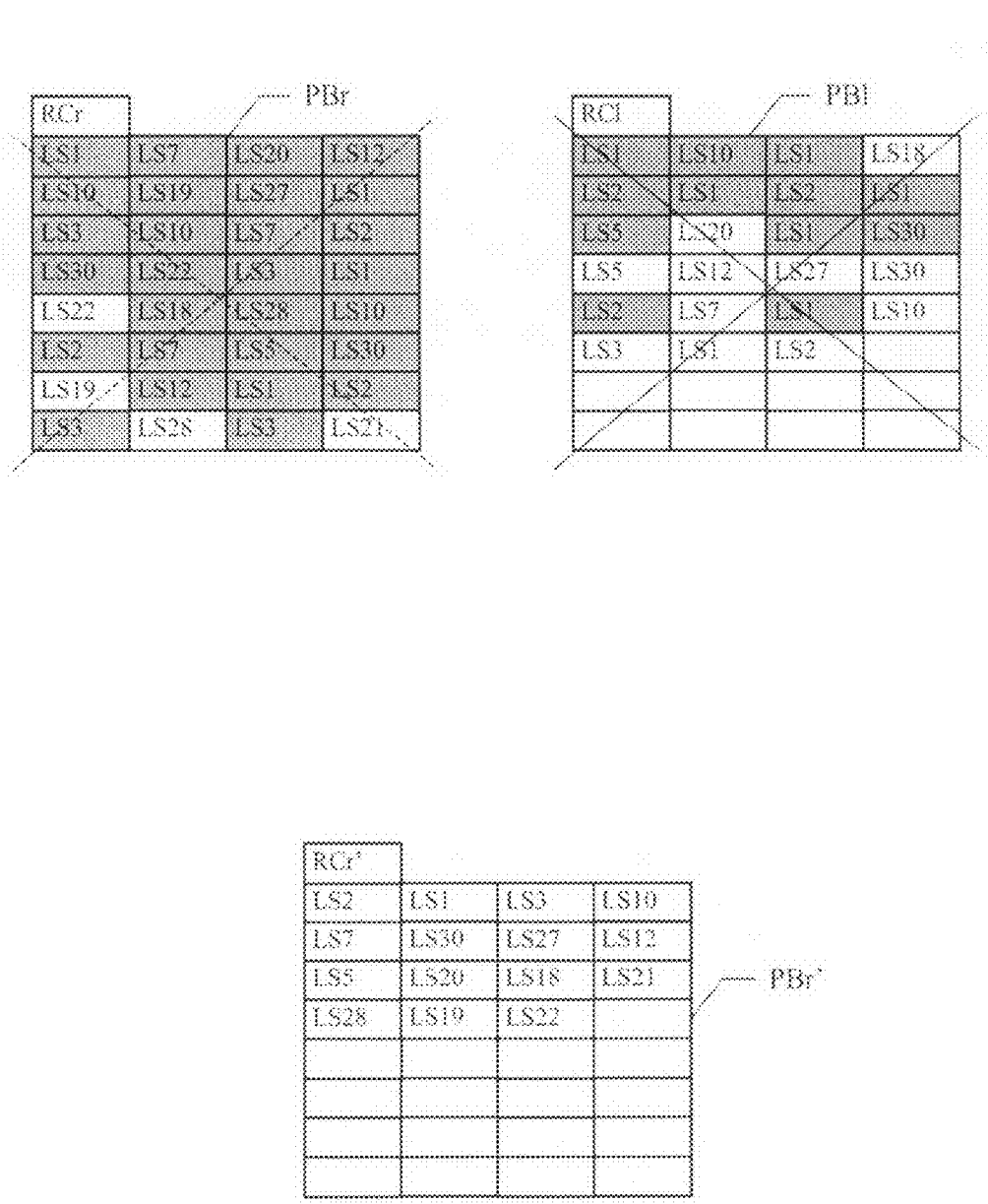

Particularly, FIG. 3B illustrates the situation resulting from a breakdown after the old leaf physical block PBl has been erased, but before the erasing of the old root physical block PBr. In this case, the correct root physical block is the new root physical block PBr'; the (garbled) old root physical block PBr is then discarded, as indicated by a cross in dashed line.

Figure 3C:
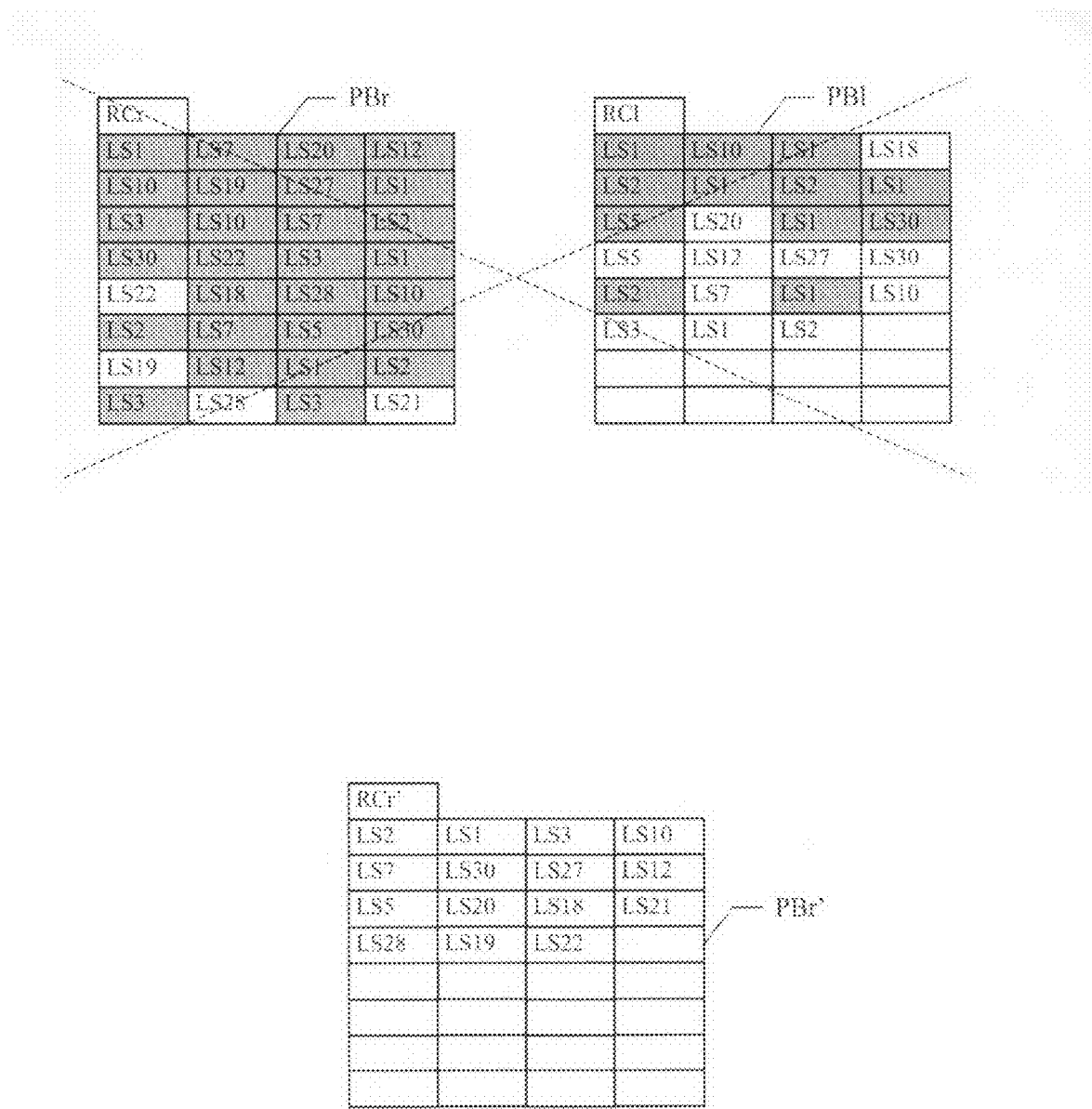

Moving to FIG. 3C, the breakdown occurred after completing the copying of all the logical sectors LSi into the new root physical block PBr', but before the erasing of the old physical blocks PBr,PBl. This situation can be detected by comparing an old validity index (indicating the number of the valid logical sectors LSi stored in the old physical blocks PBr,PBl) with a new validity index (indicating the number of the valid logical sectors LSi stored in the new root physical block PBr'—equal to total number of logical sectors LSi stored therein, being all valid); indeed, in this case the new validity index is the same as the old validity index (15 in the example at issue). Therefore, the correct root physical block is again the new root physical block PBr'; the (garbled) old root physical block PBr and old leaf physical block PBl are then discarded.

Figure 3D:
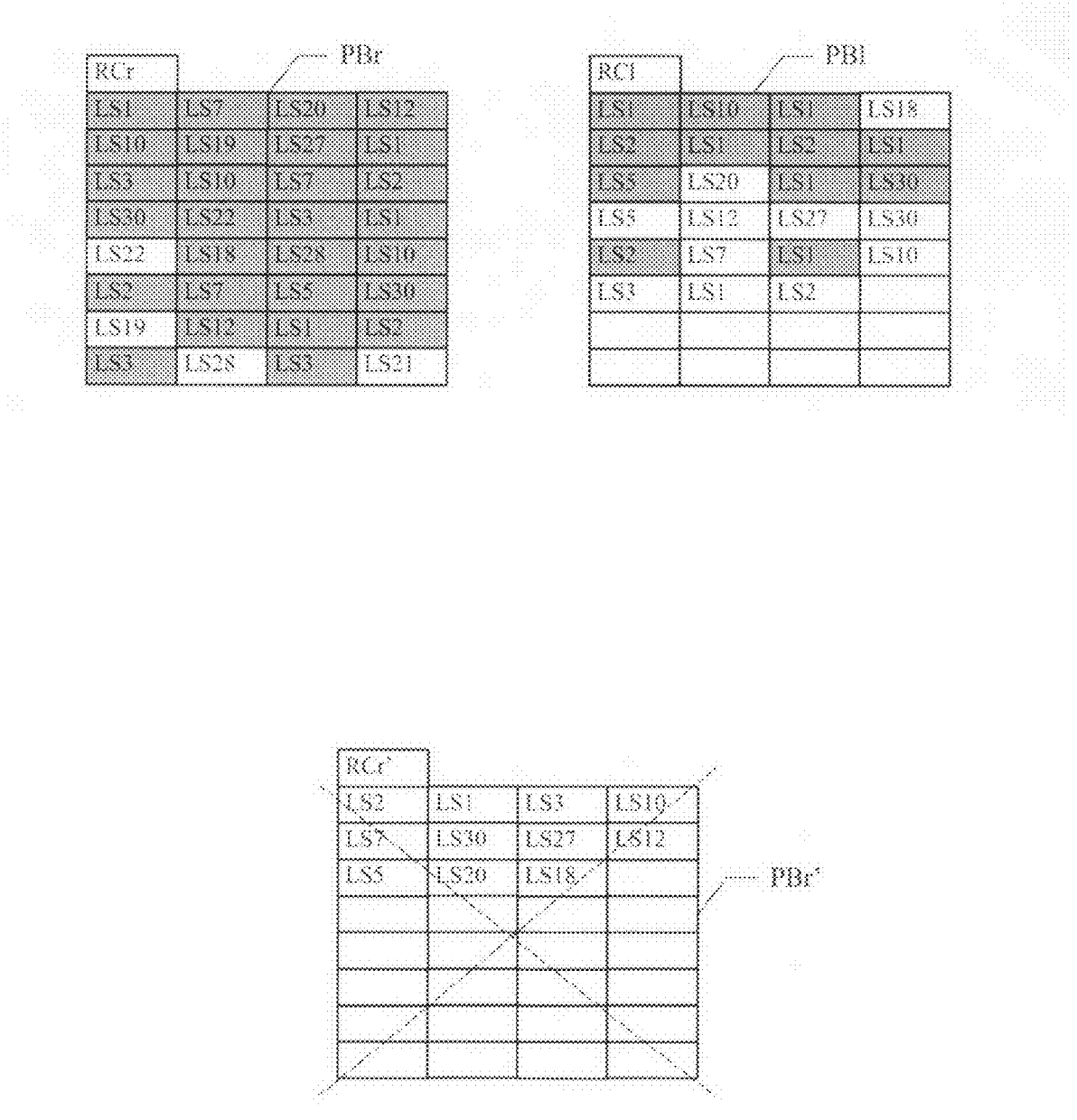

FIG. 3D shows the situation after a breakdown that occurred while the copying of the logical sectors LSi into the new root physical block PBr' was in progress; for example, in the case at issue the breakdown occurred just after copying the logical sector LS18 (into the 11$^{th}$ physical sector of the new root physical block PBr'). The situation is again detected by comparing the old validity index with the new validity index; indeed, the new validity index is now lower than the old validity index (11<15 in the example at issue). Therefore, the device returns to the situation preceding the garbage collection procedure. For this purpose, the old root physical block PBr and the old leaf physical block PBl are selected as the correct ones; the (garbled) new root physical block PBr' is instead discarded.

Figure 4A:
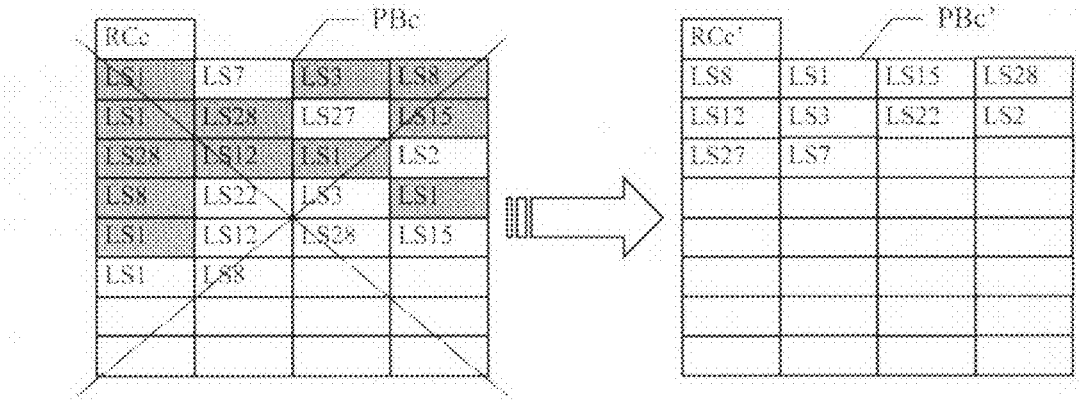
FIGS. 4A-4C show exemplary applications of the solution according to a further embodiment.

The same embodiment may also be applied to restore the storage device after a breakdown during a moving procedure; in this case, the last versions of all the logical sectors stored in a physical block are moved to another physical block. A typical application of this moving procedure is during a wear leveling process as described in the co-pending patent application entitled WEAR LEVELING IN STORAGE DEVICES BASED ON FLASH MEMORIES AND RELATED CIRCUIT, SYSTEM, AND METHOD (the entire disclosure of which is herein incorporated by reference). For example, as shown in FIG. 4A, let us consider a generic physical block (denoted with PBc) with a corresponding root counter RCc; the logical sectors stored in the physical block PBc are again denoted with LSi (being shown with a white background when valid and with a gray background when invalid). When the (old) physical block PBc is moved to a new physical block (differentiated with a prime notation, i.e., PBc'), as above the old physical block PBc is scanned backward; each encountered logical sector LSi is copied into the first available physical sector of the new physical block PBc' when it is not present yet, while it is discarded otherwise. At the end, the most recent versions of all the logical sectors LSi stored in the old physical block PBc will be written in the new physical block PBc'. In this phase, the spare area of each programmed physical sector is set accordingly. Moreover, the information relating to the new physical block PBc' (stored in the spare area of its first physical sector) is copied from the corresponding information of the old physical block PBc; particularly, the new physical block PBc' is identified as a root node or a leaf node (like the old physical block PBc) for the same logical block, and its root counter (denoted with RCc') is equal to RCc. At the same time, the mapping table is updated accordingly (so as to associate the logical block with the new physical block PBc', and each written logical sector LSi thereof with the corresponding physical sector of the new physical block PBc'). At the end, the old physical block PBc is erased.

A breakdown of the storage device may occur during different phases of the above-described moving procedure (before its completion). In any case, at the next power-on of the storage device, two conflicting physical blocks (PBc and PBc') will be associated with the same (corrupted) logical block—consisting of either two root nodes or two leaf nodes. The situation is discriminated from the one caused by the breakdown during the garbage collection procedure, since now the root counters RCc and RCc' of the two conflicting physical blocks PBc,PBc' are equal. As above, one of the conflicting physical blocks PBc,PBc' is selected as the correct one, while the other (garbled) conflicting physical block will be discarded. The logic for the selection of the correct physical block again depends on when the breakdown occurred during the moving procedure.

Figure 4B:
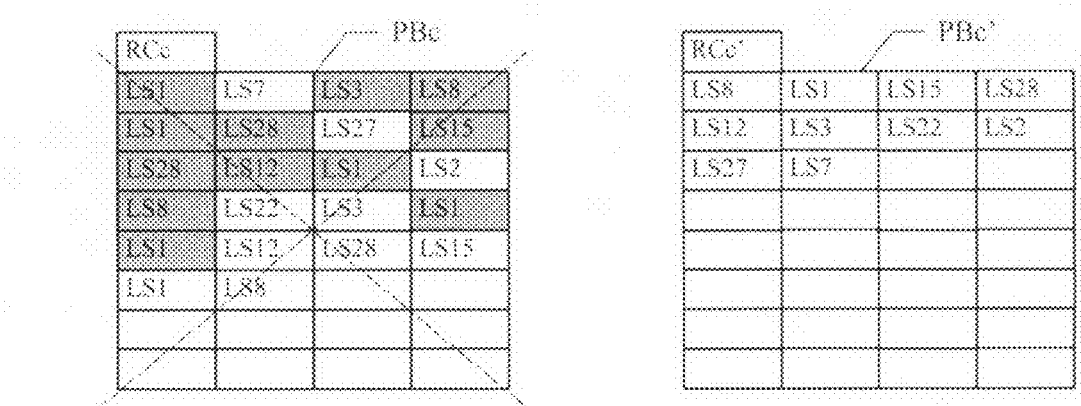

Particularly, FIG. 4B illustrates the situation resulting from a breakdown after completing the copying of all the logical sectors LSi into the new physical block PBc', but before the erasing of the old physical block PBc. This situation is detected by comparing two validity indexes, indicating the number of the valid logical sectors LSi stored in each one of the conflicting physical blocks PBc and PBc'. Indeed, in this case the two validity indexes are the same (10 in the example at issue). Therefore, any one of the two conflicting physical blocks PBc,PBc' may be selected as the correct one (with the other that is discarded).

As a further improvement, it is also possible to discriminate the new physical block PBc' from the old physical block PBc. For this purpose, a writing index—indicating the number of (valid and invalid) written logical sectors LSi (i.e., programmed physical sectors) in each one of the two conflicting physical blocks PBc,PBc' is determined. The new physical block PBc' is then identified as the one with the lower writing index (10 and 22 in the example at issue); it should be noted that when the two writing indexes are equal, the conflicting physical blocks PBc,PBc' are exactly the same (so that the choice of any one of them is indifferent). Therefore, it is now possible to select the new physical block PBc' as the correct one, while the old physical block PBc is discarded (as shown in the figure).

Figure 4C:
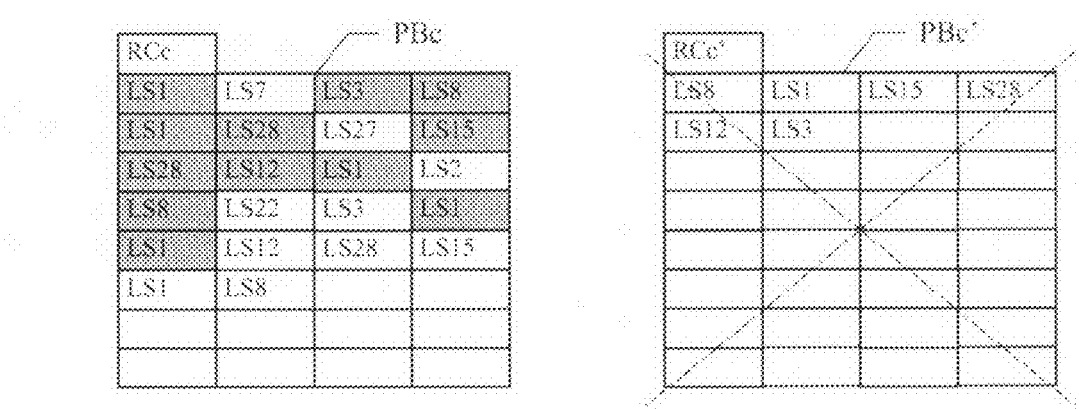

Conversely, FIG. 4C shows the situation after a breakdown that occurred while the copying of the logical sectors LSi into the new physical block PBc' was in progress (just after copying the logical sector LS22 in the example at issue). The situation is again detected by comparing the validity indexes of the two conflicting physical blocks PBc,PBc'. Indeed, in this case the two validity indexes are different; it is then possible to discriminate the old physical block PBc (with the higher validity index, 10 in the example at issue) from the new physical block PBc' (with the lower validity index, 7 in the example at issue). Therefore, the old physical block PBc is selected as the correct one, while the new physical block PBc' is discarded.

In addition or in alternative, in a solution according to a further embodiment of the present disclosure, as described in detail in the following, the restoring of the storage device is based on a completion flag for each physical sector; the completion flag is written in the spare area of the corresponding physical sector concurrently with the storing of the logical sector. This completion flag may then be used to determine—during a next reading procedure—whether the writing procedure completed regularly and then the logical sector is correct.

As above, the desired result is achieved without requiring any additional dedicated hardware (without adversely affecting the structure of the storage device); nevertheless, the proposed solution may provide a very high reliability of the storage device.

Moreover, this solution does not require any additional operation (since the completion flag is written at the same time as the corresponding logical sector); this has a beneficial effect on the performance of the storage device.

Figure 5A:
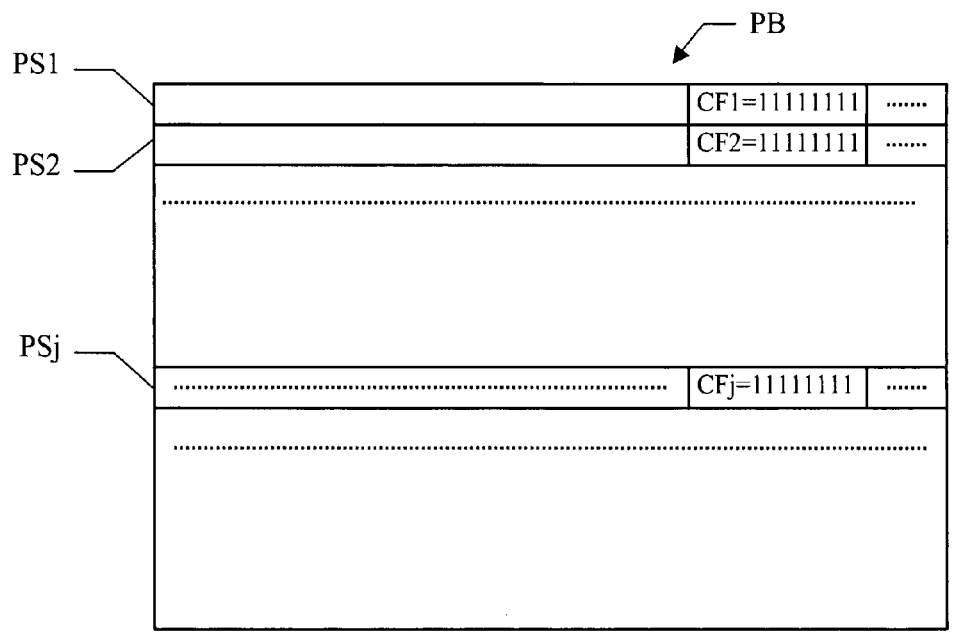
FIGS. 5A-5B show exemplary applications of the solution according to another embodiment.

For example, as shown in FIG. 5A, let us consider a generic physical block with its physical sectors (denoted with PB and PSj, j=0 . . . 31, respectively). The completion flag of each physical sector PSj (denoted with CFj) includes one or more bits (for example, 8), which bits are stored in corresponding memory cells of its spare area. At the beginning, when the physical block PB is erased, all its memory cells store a corresponding logic value (for example, 1); therefore, in this condition every completion flag CFj has an (erased) value 11111111.

Figure 5B:
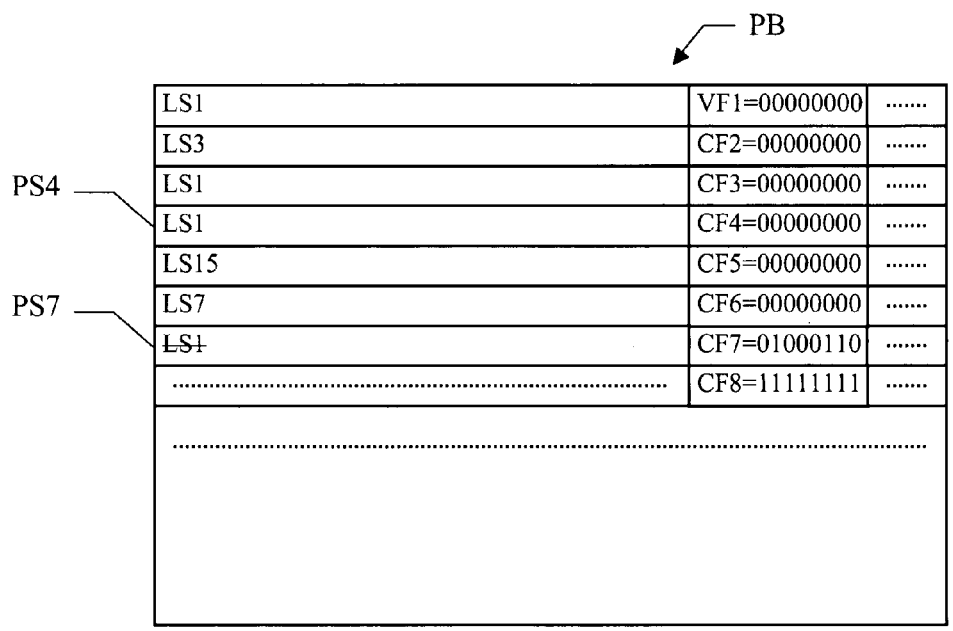

Moving to FIG. 5B, during operation of the storage device the different versions of the logical sectors of the logical block associated with the physical block PB (again denoted with LSi) are written in succession into consecutive physical sectors PSj by programming its memory cells accordingly (starting from the first physical sector PS1); at the same time, the corresponding completion flags CFj are written to a (programmed) value indicative of the completion of the operation; for example, this value is obtained by toggling all the bits of the erased value—i.e., 0000000.

When a breakdown of the storage device occurs during the programming of a generic physical sector PSj, the content of its memory cells is unpredictable; therefore, the logical sector LSi stored in the physical sector PSj may be corrupted and its completion flag CFj should be different from the programmed value. For example, the figure illustrates the situation resulting from a breakdown during the writing of the most recent version of the logical sector LS1 into the physical sector PS7; in this case, the logical sector LS1 is corrupted (as indicated by a cross line) and the completion flag CF7 is equal to 01000110.

When the same logical sector LS1 is read afterwards, the last version thereof is retrieved from the physical sector PS7 together with its completion flag CF7. Since the completion flag CF7 is different from the programmed value, the last version of the logical sector LS1 is identified as corrupted and discarded.

In this case the physical sector storing the previous version of the same logical sector LS1 (i.e., the physical sector PS4 in the example at issue) is searched. The previous version of the logical sector LS1 is then retrieved from the physical sector PS4 together with its completion flag CF4. If the completion flag CF4 has the programmed value (as it is in this case), the previous version of the logical sector LS1 is identified as correct and returned as a result of the reading procedure (in place of the corrupted version stored in the physical sector PS7). On the contrary, the same operations are reiterated until a correct version of the logical sector LS1 is found (or all the versions of the logical sector LS1 are corrupted).

Particularly, the completion flag CF1 of the first physical sector PS1 may also indicate whether the whole physical block PB is erased. Indeed, as pointed out above, the different versions of the logical sectors LSi are written in succession into the physical block PB starting from its first physical sector PS1. Therefore, when the physical block PB is erased the completion flag CF1 still has the erased value; conversely, the completion flag CF1 has any other value once at least one (either correct or corrupted) logical sector LSi has been written into the physical block PB.

Moreover, the completion flag CF1 may also be used to restore the storage device after a breakdown during an erasing procedure. Indeed, in this case the physical block PB intended to be erased is garbled, since its content is unpredictable. However, at the next power-on of the storage device any garbled physical block PB is readily identified, because its completion flag CF1 should be different from the programmed value. The garbled physical block PB can then be erased. It should be noted that the same situation may also result from a breakdown during the programming of the first physical sector PS1; in this case as well, however, the physical block PB can be erased to restore its preceding condition (before the interrupted writing procedure).

The use of completion flags CFj with multiple bits allows detecting any corrupted logical sector LSi in most practical cases. Indeed, assuming a random behavior of the flash memory after a breakdown during the programming of a generic physical sector PSj, each bit of its completion flag CFj may either have the logic value 1 or the logic value 0 with the same probability. Therefore, the probability of obtaining the programmed value 11111111 even when the logical sector LSi is corrupted is $1/(2^8-1)=0.4\%$ where CF has eight bits; in other words, the proposed embodiment detects any corrupted logical sector LSi with an accuracy equal to 100−0.4=99.6%. One may increase this accuracy by increasing the number of bits, or reduce the accuracy by decreasing the number of bits. In any case, a possible error would only cause the reading of a wrong value for the corrupted logical sector LSi (without impairing operation of the storage device).

Likewise, this allows restoring the storage device after a breakdown during an erasing procedure with a similar high accuracy. Indeed, an error would occur when the completion flag CF1 has the erased value 00000000 even when the physical block PB is garbled. As above, the probability of this event is $1/(2^8-1)=0.4\%$, so that the proposed solution again detects any garbled physical block PB with an accuracy equal to 100−0.4=99.6%. In any case, a possible error would only cause the use of a physical block PB that is not erased, so that the next writing of a logical sector LSi into its first physical block PB1 might fail (causing the actual erasing of the physical block PB without any further negative effect on the operation of the storage device).

Figure 6:
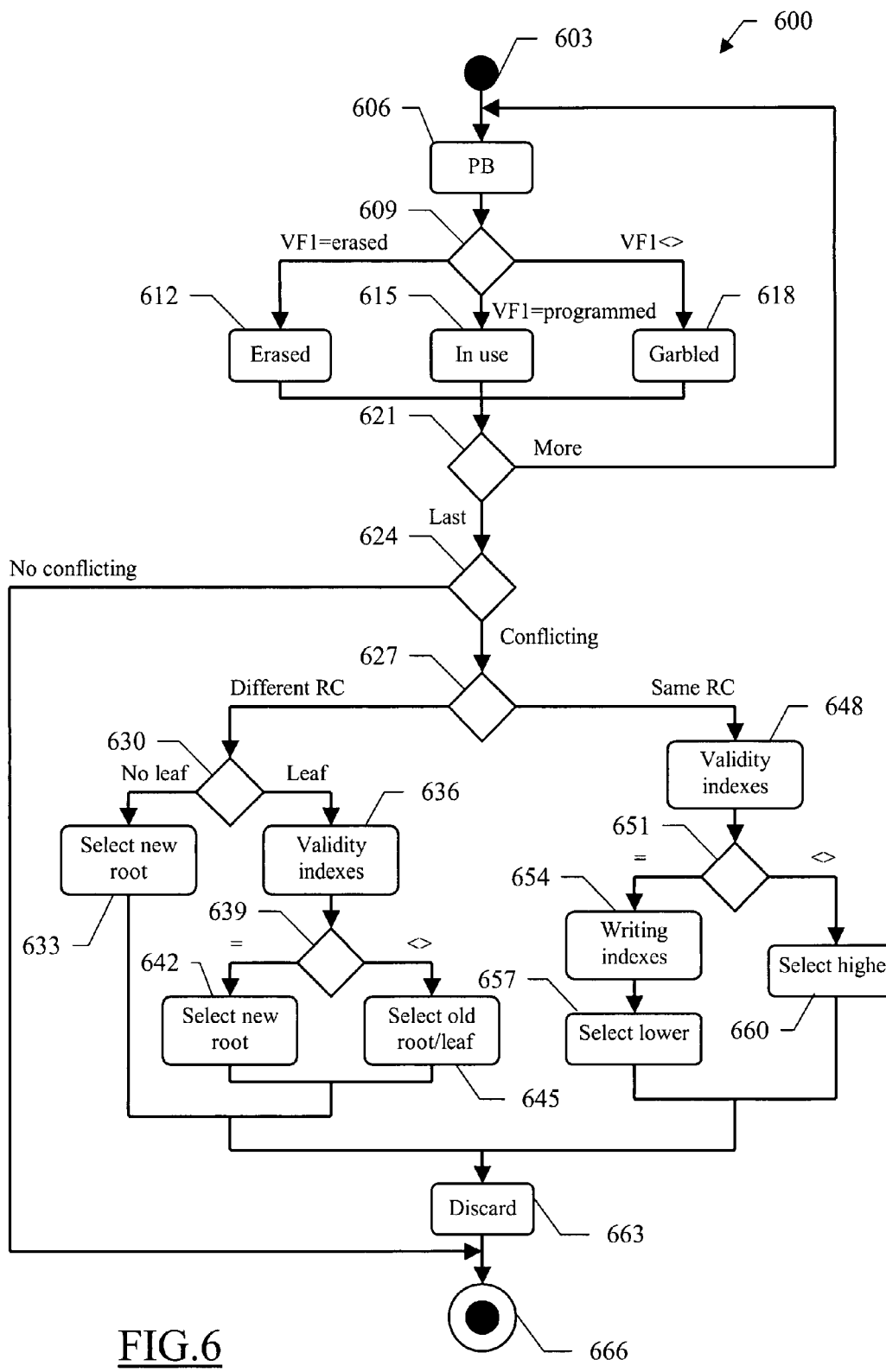
FIGS. 6-7 are diagrams describing the flow of activities relating to an implementation of a solution according to different embodiments of the present disclosure.

With reference now to FIG. 6, the logic flow of an exemplary procedure that can be implemented to initialize the above-described storage device at its power-on is represented with a method 600.

The method begins at the black start circle 603, and then performs a loop for each physical block of the flash memory. The loop is entered at block 606, wherein the service information of a current physical block—starting from the first one—is retrieved (from the spare areas of its first physical sector).

The method then branches at block 609 according to the condition of the (current) physical block. Particularly, if the completion flag of the first physical sector is equal to the erased value, the physical block is identified as erased at block 612 (and it is typically added to a corresponding list for use during operation of the storage device). Conversely, if the completion flag of the same first physical sector is equal to the programmed value, the physical block is identified as in use at block 615. At the end, if this completion flag has any other value (different from both the erased value and the programmed value), the physical block is identified as garbled at block 618 (and it is typically erased). In any case, the flow of activity again joints at block 621; in this phase, a test is made to verify whether all the physical blocks of the flash memory have been processed. If not, the method returns to block 606 to repeat the same operations for a next physical block.

Next, the physical blocks in use are checked at block 624 to determine whether conflicting physical blocks exist for the same logical block; this condition is detected when different physical blocks are associated with the same logical block, both of them as root nodes or as leaf nodes. It should be noted that, typically, at most two conflicting physical blocks—possibly with the addition of a corresponding leaf physical block—may be found (resulting from a breakdown of the storage device during a garbage collection procedure or during a moving procedure).

If so, the method branches at block 627 according to the root counters of the two conflicting physical blocks. If the root counters are different (meaning that the breakdown occurred during a garbage collection procedure), the blocks 630-645 are executed, whereas if the root counters are equal (meaning that the breakdown occurred during a moving procedure), the blocks 648-660 are executed; in both cases, the flow of activity then joints at block 663.

Considering now block 630 (breakdown during the garbage collection procedure), a test is made to verify whether a leaf physical block is associated with the conflicting (root) physical blocks. If not, the new root physical block (i.e., the one with the higher rout counter) is selected as the correct one at block 633; the method then descends into block 663. Conversely, the old validity index and the new validity index are determined at block 636 (for the old root and leaf physical blocks and for the new root physical block, respectively). The two validity indexes are then compared at decision block 639. If the new validity index is the same as the old validity index, the new root physical block is again selected as the correct one at block 642. Conversely, the old root and leaf physical blocks are selected as the correct ones at block 645. In both cases, the flow of activity then descends into block 663.

With reference instead to block 648 (breakdown during the moving procedure), the validity indexes of the two conflicting physical blocks are determined. These validity indexes are then compared at decision block 651. If the validity indexes are the same, the method continues to block 654, wherein the writing indexes for the two conflicting physical blocks are determined as well. Proceeding to block 657, the conflicting physical block with the lower writing index (i.e., the new physical block) is selected as the correct one at block 657; the flow of activity then descends into block 663. Referring back to block 651, when the two validity indexes are different the conflicting physical block with the higher validity index (i.e., the old physical block) is selected as the correct one at block 660; the flow of activity likewise descends into block 663.

Considering now block 663, the other conflicting physical block(s) being not selected are discarded (so as to be erased). The method then ends at the concentric white/black stop circles 666. The same point is also reached from block 624 directly, when no conflicting physical blocks exist.

Figure 7:
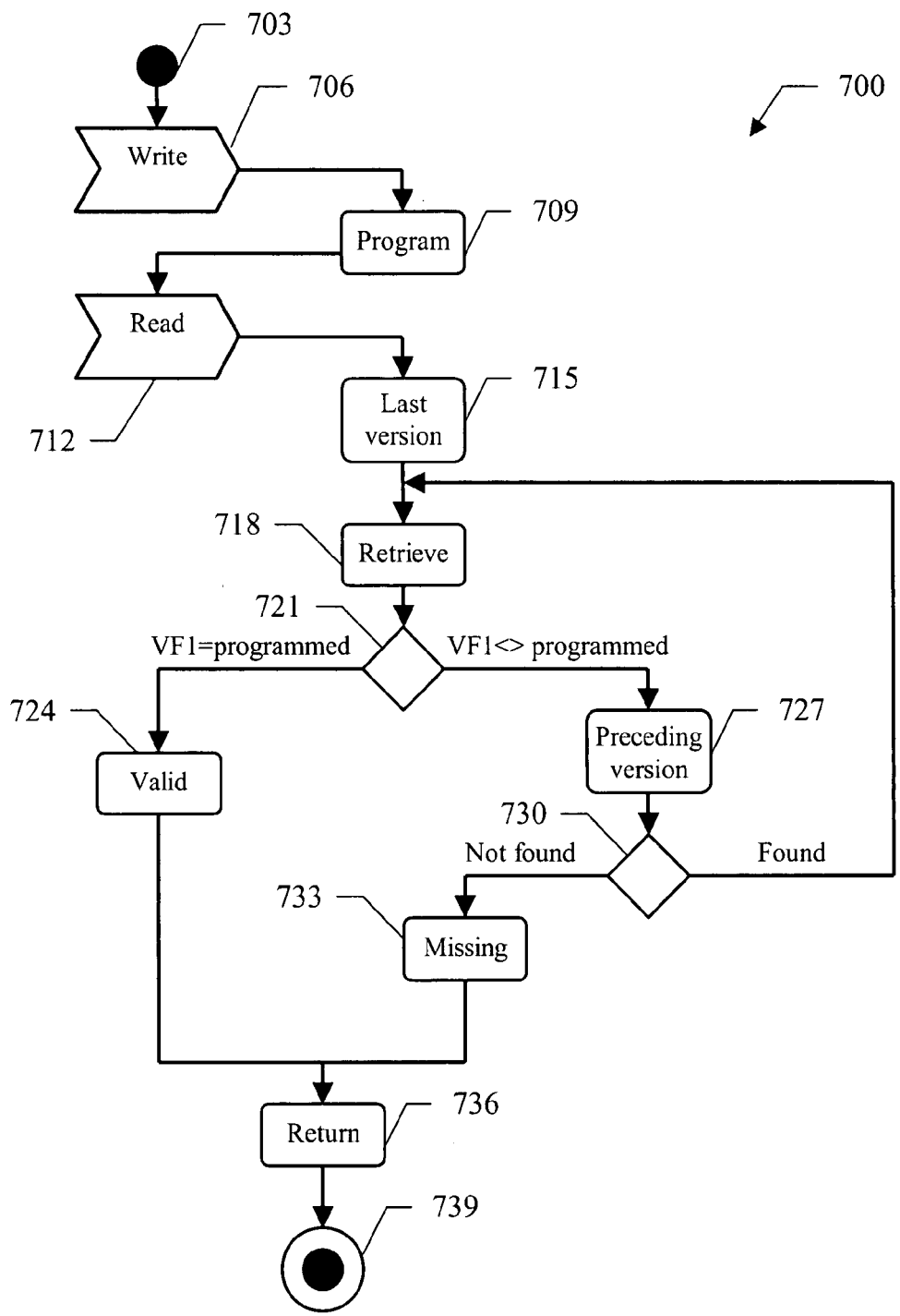

During operation of the storage device, as shown in FIG. 7, writing and reading procedures are continually executed; an exemplary flow of activity relating thereto is represented in the figure with a method 700.

The method begins at the black start circle 703. Whenever a new version of a generic selected logical sector is to be written (block 706), the method passes to block 709; in this phase, a first available physical block (in the root or leaf physical block associated with its logical block) is accordingly programmed; particularly, the desired value of the logical sector and the completion flag with the programmed value are written in the main area and in the spare area, respectively, of the physical sector.

Later on, the reading of a generic selected logical sector is performed at block 712. In response thereto, the physical sector storing its last version is identified at block 715 (as indicated in the mapping table). Passing to block 718, the value of the logical sector and the corresponding completion flag are retrieved from the main area and the spare area, respectively, of this physical sector.

The method now branches at block 721 according to the value of the retrieved completion flag. The block 724 is executed if the completion flag has the programmed value, whereas the blocks 727-733 are executed otherwise; in both cases, the method then passes to block 736.

With reference in particular to block 724, the retrieved logical sector is identified as correct when the completion flag has the programmed value (meaning that the programming of the corresponding physical sector completed correctly); the flow of activity then descends into block 736.

Considering instead block 727, the retrieved logical sector is corrupted when the completion flag has any other value (meaning that a breakdown occurred during the programming of the corresponding physical sector); in this case, the physical sector storing the previous version of the desired logical sector is searched in the root and/or leaf physical blocks associated with its logical block. The method then continues to decision block 730. If no previous version of the logical sector has been found, the logical sector is set as missing at block 733; the flow of activity then descends into block 736. Conversely, the method returns to block 718 to repeat the same operations described above with this previous version of the logical sector.

With reference now to block 736, the result of the reading procedure is returned. Therefore, the obtained result will consist of the most recent version of the logical sector being valid if available, or an error message otherwise. The method then ends at the concentric white/black stop circles 739.

Naturally, in order to satisfy local and specific requirements, a person skilled in the art may apply to the solution described above many logical and/or physical modifications and alterations. More specifically, although the present disclosure has been described with a certain degree of particularity with reference to embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any disclosed embodiment may be incorporated in any other embodiment as a matter of general design choice.

Particularly, the proposed solution lends itself to be implemented with equivalent methods (by using similar steps, removing some steps being non-essential, or adding further optional steps); moreover, the steps may be performed in a different order, concurrently or in an interleaved way (at least in part).

Similar considerations apply if the storage device emulates an equivalent logical memory space (with a different number and/or size of the logical blocks, each one including logical sectors with a different number and/or size); likewise, the physical memory space of the flash memory may have a different number and/or size of the physical blocks, each one including physical pages with a different number and/or size. Alternatively, it is possible to implement the mapping of the logical memory space on the physical memory space with different techniques (for example, by associating two or more physical pages with each logical sector, by storing the required information in any other way, and the like); moreover, it is possible to implement a different mapping structure and a dynamic bad block management, with the corresponding forced garbage collection procedures (as described in the co-pending patent application entitled GARBAGE COLLECTION IN STORAGE DEVICES BASED ON FLASH MEMORIES, the entire disclosure of which is herein incorporated by reference to the maximum extent allowable by law).

Even though in the preceding description reference has been made to the restoring of the storage device after a power loss, the same solution may also be applied to any sudden breakdown being caused by whatever event (for example, an abort of the control unit). Likewise, the proposed solution may be used to correct whatever inconsistent condition that may result from the breakdown of the storage device during any other procedure (involving any update of the data stored in the flash memory).

The proposed validity indexes (and the procedure for their determination) are merely illustrative; for example, nothing prevents calculating the number of the valid logical sectors in each logical block at the power-on of the storage device and then maintaining these values up-to-date during operation of the storage device (for example, by storing them in the mapping table).

Alternatively, the conflicting physical blocks may be discarded in a different way—for example, by erasing them directly or by simply adding them to an invalid list for their next erasure (as described in the co-pending patent application entitled MANAGEMENT OF ERASE OPERATIONS IN STORAGE DEVICES BASED ON FLASH MEMORIES, the entire disclosure of which is herein incorporated by reference to the maximum extent allowable by law).

The use of the proposed solution to any tree structure (with a root node and one or more child nodes) for each logical block is contemplated. Likewise, the garbage collection procedure may be controlled in a different way (for example, according to specific algorithms based on the current filling rate of the flash memory); in this case as well, the old physical blocks may be discarded by either erasing them immediately or later on.

Similar considerations apply if the root counters span a different range, if they are updated in another way (for example, by decreasing their values), and the like. In any case, the use of any other indicator of the new root physical block is not excluded (for example, based on a thermometric code).

The proposed solution lends itself to be applied even to equivalent moving procedures—for example, involving the simple copy of every physical sector (storing either a valid or an invalid logical sector), or even the copy of the whole physical block.

Moreover, any other service information (being different in the conflicting root physical blocks following the breakdown during the garbage collection procedure and being the same following the breakdown during the moving procedure) may be used to discriminate the different situations.

In a different embodiment (after the breakdown during the moving procedure), the two conflicting physical blocks having the same validity indexes may be discriminated in a different way (for example, by verifying the first available physical block in each one of them). However, this feature is not strictly necessary and it may be omitted in a simplified implementation (wherein the selection of the correct physical block in this condition is random).

Similar considerations apply if the corrupted versions of the logical sector (whose completion flag is not asserted) are managed in a different way; for example, it is possible to provide a warning signal when the returned version of the logical sector is not the last one, to set the logical sector to a null value when no valid version thereof is found, and the like.

In any case, it is emphasized that this feature is not essential and it may be omitted in a simplified implementation of the storage device. Vice-versa, the same feature is suitable to be used (alone or combined with any one of the other additional features described above) even without the proposed algorithm for restoring the storage device based on the counting of the valid logical sectors.

Alternatively, it is possible to implement the completion flag with an equivalent indicator—for example, including another number of bits, with a different erased value and/or programmed value, and the like. Anyway, in a simplified embodiment nothing prevents using a completion flag of a single bit.

As above, any garbled physical block (resulting from a breakdown during the erasing procedure) may be discarded by either erasing it immediately or later on. In any case, the use of the completion flag of the first physical sector in each physical block for determining when the physical block is garbled is not strictly necessary (and it may be replaced with the use of another flag specifically dedicated to this purpose).

Even though in the preceding description reference has been made to a flash memory with NAND architecture, this is not to be interpreted in a limitative manner; more generally, the proposed solution lends itself to be used in a storage device based on any other flash memory (for example, of the NOR type, of the phase-change type, and the like).

Similar considerations apply if the program (which may be used to implement each embodiment) is structured in a different way, or if additional modules or functions are provided; likewise, the memory structures may be of other types, or may be replaced with equivalent entities (not necessarily consisting of physical storage media). In any case, the program may take any form suitable to be used by or in connection with any control system of the storage device, such as software, firmware, or microcode. Moreover, it is possible to provide the program on any medium being adapted to be used by the control system; the medium can be any element suitable to contain, store, communicate, propagate, or transfer the program. For example, the medium may be of the electronic, magnetic, optical, electromagnetic, infrared, or semiconductor type; examples of such medium are the flash memory itself or a ROM (where the program can be pre-loaded), wires, wireless connections, broadcast waves, and the like. In any case, the solution according to one or more embodiments of the present disclosure lends itself to be implemented with a hardware structure (for example, integrated in a chip of semiconductor material), or with a combination of software and hardware.

Alternatively, the control system (being used to restore operation of the storage device) may have a different structure or it may include equivalent components.

Likewise, the above-described architecture of the storage device is merely illustrative, and it must not be interpreted in a limitative manner.

It should be readily apparent that the proposed structure might be part of the design of an integrated circuit. The design may also be created in a programming language; moreover, if the designer does not fabricate chips or masks, the design may be transmitted by physical means to others. In any case, the resulting integrated circuit may be distributed by its manufacturer in raw wafer form, as a bare die, or in packages. Moreover, the proposed structure may be integrated with other circuits in the same chip, or it may be mounted in intermediate products (such as mother boards).

In any case, it should be noted that the storage device may be used in any other data processing system; further examples of such system are an MP3 player, a digital camera, a PDA, a laptop computer, and the like.

From the foregoing it will be appreciated that, although specific embodiments of the present disclosure have been described herein for purposes of illustration, various modifications may be made without deviating from the spirit and scope of the present disclosure.

What is claimed is:

1. A method for restoring operation of a storage device based on a flash memory, the storage device emulating a logical memory space, including a plurality of logical blocks each one having a plurality of logical sectors, being mapped on a physical memory space of the flash memory including a plurality of physical blocks each one having a plurality of physical sectors for storing different versions of the logical sectors, wherein the method includes the steps for:
    detecting a plurality of conflicting physical blocks for a corrupted logical block resulting from a breakdown of the storage device,
    determining a plurality of validity indexes calculated from the number of last versions of the logical sectors of the corrupted logical block being stored in the conflicting physical blocks,
    selecting at least one of the conflicting physical blocks according to the validity indexes,
    associating the at least one selected conflicting physical block with the corrupted logical block, and
    discarding each one of the non-selected conflicting physical blocks;
    wherein consecutive versions of the logical sectors of each logical block are stored in succession in the physical sectors of a root physical block and at least one child physical block when the root physical block is full, the step for detecting the conflicting physical blocks including:
        detecting two conflicting root physical blocks for the corrupted logical block resulting from the breakdown of the storage device during a garbage collection procedure including compacting an old root physical block and at least one child physical block storing the corrupted logical block into a new root physical block storing the last versions only of the logical sectors of the corrupted logical block and discarding the old root physical block and the at least one child physical block, the new root physical block including a new root indicator, and
        discriminating the old root physical block and the new root physical block according to the new root indicator, wherein the step for determining the validity indexes includes:
    determining an old validity index calculated from the number of last versions of the logical sectors of the corrupted logical block being stored in the old root physical block and the at least one child physical block, and a new validity index calculated from the number of last versions of the logical sectors of the corrupted logical block being stored in the new root physical block, and wherein the step for selecting at least one of the conflicting physical blocks includes: selecting the new root physical block when the at least one child physical block has been discarded, or otherwise selecting the new root physical block when the new validity index is equal to the old validity index or selecting the old root physical block and the at least one child physical block when the old validity index is higher than the new validity index.

2. The method according to claim 1, wherein each root physical block includes a root counter, a new root counter of the new root physical block being obtained by updating an old root counter of the old root physical block according to a wrap-around sequence, and wherein the step for discriminating the old root physical block and the new root physical block includes:
    identifying the new root physical block as the conflicting root physical block having the root counter following the root counter of the other conflicting physical block in the wrap-around sequence.

3. The method according to claim 2, wherein the step for detecting the conflicting physical blocks includes:
    detecting two conflicting physical blocks for the corrupted logical block resulting from the breakdown of the storage device during a moving procedure of an old physical block at least partially storing the corrupted logical block to a new physical block,
and wherein the step for selecting at least one of the conflicting physical blocks includes:
    selecting the conflicting physical block having the higher validity index.

4. The method according to claim 3, wherein the method further includes the step for:
    identifying the breakdown during the moving procedure in response to the root counters of the two conflicting physical blocks being equal or the breakdown during the garbage collection procedure in response to the root counters of the two conflicting root physical blocks being different.

5. The method according to claim 3, wherein the step for selecting the conflicting physical block includes, in response to the validity indexes of the conflicting physical blocks being equal:
    determining a writing index indicative of the number of the different versions of the logical sectors of the corrupted logical block being stored in each conflicting physical block, identifying the new physical block as the conflicting physical block having the lower writing index, and selecting the new physical block.

6. The method according to claim 1, wherein each physical sector includes a plurality of first memory cells defining a main area for storing a logical sector and a plurality of second memory cells defining a spare area for storing service information, the method further including the steps for:

writing the last version of a selected logical sector by programming an associated physical sector to concurrently store the last version of the selected logical sector in the corresponding main area and a completion flag being asserted in the corresponding spare area, reading the selected logical sector by accessing the associated physical sector to retrieve the last version of the selected logical sector being stored in the corresponding main area and the completion flag being stored in the corresponding spare area, and discarding the last version of the selected logical sector in response to the retrieved completion flag being not asserted.

7. The method according to claim 6, further including repeating the steps for:

searching a further physical sector storing a preceding version of the selected logical sector, and accessing the further physical sector to further retrieve the preceding version of the selected logical sector being stored in the corresponding main area and the completion flag being stored in the corresponding spare area, until the further retrieved completion flag is asserted.

8. The method according to claim 6, wherein the completion flag includes a plurality of bits adapted to take a first value or a second value indicative of an erased condition or a programmed condition, respectively, of the corresponding memory cells, the completion flag being asserted when all the bits have the second value.

9. The method according to claim 8, wherein the different versions of the logical sectors are written in succession into the physical sectors of each physical block according to a writing sequence, the method further including the steps for:

reading the completion flag of a first physical sector of each physical block in the writing sequence, and discarding the physical block when the bits of the completion flag of the first physical sector do not have all the first value or all the second value.

10. The method according to claim 1, wherein the flash memory is of the NAND type.

* * * * *